United States Patent
Cooper et al.

(10) Patent No.: US 9,233,669 B2
(45) Date of Patent: Jan. 12, 2016

(54) METHODS AND SYSTEMS FOR SPEED MANAGEMENT WITHIN A TRANSPORTATION NETWORK

(71) Applicant: General Electric Company, Schenectady, NY (US)

(72) Inventors: Jared Klineman Cooper, Melbourne, FL (US); Kiron Viegas, Melbourne, FL (US)

(73) Assignee: General Electric Company, Schenectady, NY (US)

( * ) Notice: Subject to any disclaimer, the term of this patent is extended or adjusted under 35 U.S.C. 154(b) by 123 days.

(21) Appl. No.: 14/147,610

(22) Filed: Jan. 6, 2014

(65) Prior Publication Data

US 2014/0365096 A1   Dec. 11, 2014

Related U.S. Application Data

(60) Provisional application No. 61/833,187, filed on Jun. 10, 2013.

(51) Int. Cl.
| | |
|---|---|
| *B60T 8/17* | (2006.01) |
| *B60T 8/172* | (2006.01) |
| *B60T 7/18* | (2006.01) |
| *B60T 13/66* | (2006.01) |
| *B60T 17/22* | (2006.01) |
| *B60K 31/02* | (2006.01) |

(52) U.S. Cl.
CPC .............. *B60T 8/1705* (2013.01); *B60T 7/18* (2013.01); *B60T 8/172* (2013.01); *B60T 13/665* (2013.01); *B60T 17/228* (2013.01); *B60K 31/02* (2013.01); *B60T 2260/00* (2013.01); *B60T 2260/08* (2013.01)

(58) Field of Classification Search
CPC ...... B60K 31/00; B60K 31/02; B60T 8/1705; B60T 8/172; B60T 2260/00; B60T 2260/08; B60T 2260/09
See application file for complete search history.

(56) References Cited

U.S. PATENT DOCUMENTS

| | | | | | |
|---|---|---|---|---|---|
| 4,410,154 | A | * | 10/1983 | Matty | .............................. 701/20 |
| 5,172,316 | A | * | 12/1992 | Root | .................... B60T 13/665 701/70 |
| 5,249,125 | A | * | 9/1993 | Root | .................... B60T 13/665 701/70 |

(Continued)

FOREIGN PATENT DOCUMENTS

WO       2010093760 A1     8/2010

OTHER PUBLICATIONS

Australian Examination Report issued in connection with corresponding AU Application No. 2014203110 on Oct. 29, 2014.

*Primary Examiner* — Tuan C. To
*Assistant Examiner* — Dale W Hilgendorf
(74) *Attorney, Agent, or Firm* — GE Global Patent Operation; John A. Kramer

(57) ABSTRACT

A method includes operating a vehicle traveling in a transportation network with a throttle of the vehicle at a maximum throttle setting during a trip of the vehicle along a route from a first location to a different, second location. The method also includes applying a dynamic brake of the vehicle at a maximum brake setting of the dynamic brake, and alternating between operating the vehicle with the throttle at the maximum throttle setting and applying the dynamic brake of the vehicle at the maximum brake setting along a route being traveled by the vehicle from the first location to the second location.

20 Claims, 5 Drawing Sheets

(56) References Cited

U.S. PATENT DOCUMENTS

| | | | | |
|---|---|---|---|---|
| 6,144,901 A * | 11/2000 | Nickles | ................ | B60T 13/665 701/19 |
| 7,395,141 B1 * | 7/2008 | Seck et al. | ...................... | 701/19 |
| 2007/0219681 A1 * | 9/2007 | Kumar | .................... | B61L 3/006 701/19 |
| 2007/0233335 A1 * | 10/2007 | Kumar et al. | .................... | 701/22 |
| 2010/0241296 A1 * | 9/2010 | Rhea et al. | ....................... | 701/20 |
| 2010/0332058 A1 * | 12/2010 | Kane et al. | ....................... | 701/20 |

* cited by examiner

METHODS AND SYSTEMS FOR SPEED MANAGEMENT WITHIN A TRANSPORTATION NETWORK

CROSS-REFERENCE TO RELATED APPLICATIONS

This application is a non-provisional application that claims priority to and the benefit of the filing date of U.S. Provisional Application No. 61/833,187, filed on Jun. 10, 2013, and entitled "METHODS AND SYSTEMS FOR SPEED MANAGEMENT WITHIN A TRANSPORTATION NETWORK", which is hereby incorporated by reference in its entirety.

FIELD

The subject matter described herein generally relates to methods and systems for speed management of a vehicle traveling within a transportation network.

BACKGROUND

Energy management systems (EMSs) are associated with at least some known vehicles. For example, at least some known vehicles include EMSs onboard the vehicle. The EMS associated with a vehicle uses a trip plan that dictates one or more operations of a propulsion system (e.g., traction motors, brakes) of the vehicle during a trip of the vehicle within a transportation network. The trip plan may be generated using a trip profile that includes information related to the vehicle, the route, and/or surface on which the vehicle travels, the geography over which the route or surface extends, and/or other information. The trip plan can be used to control, for example, the propulsion system of the vehicle to change and/or set the tractive and/or braking efforts of the propulsion system as the vehicle travels over different segments of the trip according to the trip plan.

EMSs are often utilized to control propulsion operations of a vehicle during a trip to increase efficiency (e.g., reduce fuel consumption, reduce emissions, and/or the like) of the vehicle. But, in some circumstances, a vehicle may need to travel as fast as possible with no regard to efficiency. For example, a vehicle may get behind schedule during a trip and may therefore need to travel at an increased speed to compensate for the delay and thereby complete the trip at the scheduled arrival time. Moreover, and for example, some rail vehicles are "hot shot" vehicles, which are relatively fast, non-stop trains that are given priority on railroad tracks. The operation of hot shot trains are typically concerned with completing trips in the shortest time possible at the expense of efficiency.

But, it may be unlawful and/or unsafe to operate a vehicle at an increased speed without regard to efficiency. For example, the vehicle may violate a posted speed limit, which may increase a cost of the trip via associated fines and/or may cause unsafe operation of the vehicle. Unsafe operation of the vehicle may cause the vehicle to disobey a traffic signal and thereby possibly cause a traffic accident, which may result in property damage (e.g., to the vehicles involved) and/or injury to the operators of the vehicle and/or pedestrians. Unsafe operation of the vehicle may cause an operator or automated control system to lose control of the vehicle, which may result in an accident that damages the vehicle, damages nearby structures, and/or injures the operator of the vehicle and/or pedestrians. One specific example of the loss of control of a vehicle caused by excessive speed is the derailment of a train from a rail track.

Moreover, and for example, operating a vehicle at an increased speed without regard to efficiency may cause damage to the vehicle. For example, components of the vehicle may not be rated for a particular speed and may therefore malfunction and/or fail when such a speed is exceeded by the vehicle. One specific problem with rail vehicles is that a group of interconnected rail vehicles (e.g., a train, a consist, etc.) may break apart from each other when the rail vehicle group exceeds a particular speed. Such a breakup of a group of interconnected rail vehicles can result in significant property damage, injury, and/or delays within the rail network.

BRIEF DESCRIPTION

In an embodiment, a method includes operating a vehicle traveling in a transportation network with a throttle of the vehicle at a maximum throttle setting during a trip of the vehicle along a route from a first location to a different, second location. The method also includes applying a dynamic brake of the vehicle at a maximum brake setting of the dynamic brake, and alternating between operating the vehicle with the throttle at the maximum throttle setting and applying the dynamic brake of the vehicle at the maximum brake setting along a route being traveled by the vehicle from the first location to the second location.

In an embodiment, a method includes generating one or more alternating throttle and dynamic brake instructions for a vehicle configured to travel in a transportation network to alternate between operating the vehicle with a throttle of the vehicle at a maximum throttle setting and applying a dynamic brake of the vehicle at a maximum brake setting of the dynamic brake along a route being traveled by the vehicle. The method also includes at least one of creating or revising a trip plan of a trip of the vehicle within the transportation network such that the trip plan includes the one or more alternating throttle and dynamic brake instructions for at least one segment of the trip. The trip plan designates operational settings of the vehicle as a function of at least one of distance or time along the trip of the vehicle.

In an embodiment, a system includes a control unit configured to control operation of a vehicle that is configured to travel in a transportation network. The control unit is configured to operate the vehicle with a throttle of the vehicle at a maximum throttle setting during a trip of the vehicle along a route from a first location to a different, second location, apply a dynamic brake of the vehicle at a maximum brake setting of the dynamic brake, and alternate between operating the vehicle with the throttle at the maximum throttle setting and applying the dynamic brake of the vehicle at the maximum brake setting along the route being traveled by the vehicle from the first location to the second location.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
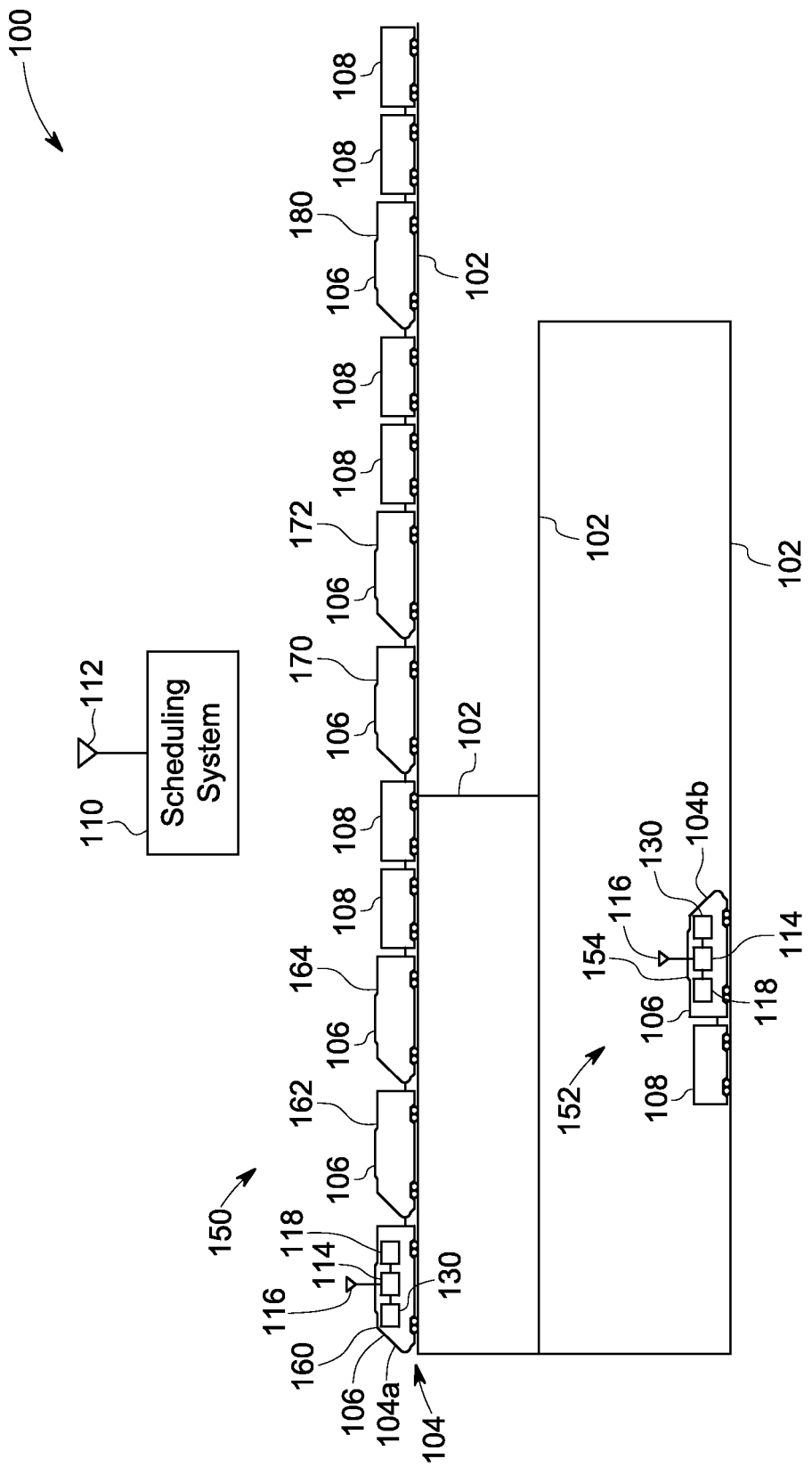
FIG. 1 is a schematic diagram of a transportation network according to an embodiment of the inventive subject matter described herein.

One or more embodiments of the inventive subject matter described herein provide systems and methods for operating a vehicle traveling in a transportation network with a throttle of the vehicle at a maximum throttle setting during a trip of the vehicle along a route from a first location to a different, second location, applying a dynamic brake of the vehicle at a maximum brake setting of the dynamic brake, and alternating between operating the vehicle with the throttle at the maximum throttle setting and applying the dynamic brake of the vehicle at the maximum brake setting along a route being traveled by the vehicle from the first location to the second location. The methods and systems may generate one or more alternating throttle and dynamic brake instructions to alternate between operating the vehicle with a throttle of the vehicle at a maximum throttle setting and applying a dynamic brake of the vehicle at a maximum brake setting of the dynamic brake along a route being traveled by the vehicle. The methods and system may create and/or revise a trip plan of a trip of the vehicle within the transportation network such that the trip plan includes the alternating throttle and dynamic brake instruction(s) for at least one segment of the trip.

At least one technical advantage of various embodiments of the inventive subject matter described herein includes enabling the vehicle to travel as fast as possible along the route (or along a segment of the route), for example with no regard to efficiency. At least one technical advantage of various embodiments of the inventive subject matter described herein is reducing a travel time of the vehicle over the entire route and/or along one or more segments of the route. At least one technical advantage of various embodiments of the inventive subject matter described herein includes enabling the vehicle to travel as fast as possible without disobeying designated speed limits along the route. At least one technical advantage of various embodiments of the inventive subject matter described herein includes enabling the vehicle to travel as fast as possible without damaging the vehicle. At least one technical advantage of various embodiments of the inventive subject matter described herein includes enabling the vehicle to travel as fast as possible within designated safe operating limits of the vehicle. At least one technical advantage of various embodiments of the inventive subject matter described herein includes enabling the vehicle to travel as fast as possible without the losing control, without derailing, and/or without causing a traffic accident.

At least one technical advantage of various embodiments of the inventive subject matter described herein includes enabling the vehicle to travel at an increased speed to compensate for a delay of the vehicle that caused the vehicle to fall behind schedule. At least one technical advantage of various embodiments of the inventive subject matter described herein includes enabling a hot shot vehicle to travel non-stop at the highest possible speed that is within legal and designated safe operating limits. At least one technical advantage of various embodiments of the inventive subject matter described herein includes enabling the vehicle to travel at a faster speed along one or more segments of the route to compensate for one or more downstream segments of the route where the vehicle may have to travel at a reduced speed.

FIG. 1 is a schematic diagram of an embodiment of a transportation network 100. The transportation network 100 includes a plurality of interconnected routes 102, such as railroad tracks, roads, and/or other paths across which vehicles travel. The transportation network 100 may extend over a relatively large area, such as hundreds of square miles or kilometers of land area. While only one transportation network 100 is shown in FIG. 1, one or more other transportation networks 100 may be joined with and accessible to vehicles traveling in the illustrated transportation network 100. For example, one or more of the routes 102 may extend to another transportation network 100 such that vehicles can travel between the transportation networks 100. Different transportation networks 100 may be defined by different geographic boundaries, such as different towns, cities, counties, states, groups of states, countries, continents, and/or the like. The number of routes 102 shown in FIG. 1 is meant to be illustrative and not limiting on embodiments of the described subject matter. Moreover, while one or more embodiments described herein relate to a transportation network formed from railroad tracks, not all embodiments are so limited. One or more embodiments may relate to transportation networks in which vehicles other than rail vehicles travel. For example, in addition or alternative to the railroad tracks, the transportation network 100 may be formed by any other structure, pathway, and/or the like, such as, but not limited to, roads, highways, interstates, flight paths through airspace, waterways, and/or the like.

Several vehicles 104 travel along the routes 102 in the transportation network 100. The vehicles 104 may concurrently travel in the transportation network 100 along the same or different routes 102. Travel of one or more vehicles 104 may be constrained to travel within the transportation network 100 (referred to herein as "intra-network travel"). Alternatively, one or more of the vehicles 104 may enter the transportation network 100 from another transportation network or leave the transportation network 100 to travel into another transportation network (referred to herein as "inter-network travel"). In the illustrated embodiment, the vehicles 104 are shown and described herein as rail vehicles or rail vehicle consists. However, one or more other embodiments may relate to vehicles other than rail vehicles or rail vehicle consists. For example, the vehicles 104 may represent other off-highway vehicles, automobiles (e.g., cars, busses, and/or the like), marine vessels, airplanes, and/or the like. The vehicles 104 are individually referred to by the reference numbers 104a and 104b. While two vehicles 104 are shown in FIG. 1, alternatively, a different number of vehicles 104 may be concurrently traveling in the transportation network 100.

A vehicle 104 may include one or more powered units 106 (referring to rail vehicles configured for self propulsion, e.g., locomotives and/or the like) and/or one or more non-powered units 108 (referring to rail vehicles not configured for self propulsion, e.g., cargo cars, passenger cars, and/or the like) that are mechanically coupled or linked together to travel along the routes 102. The term "powered" refers to the capability of the units 106 to propel themselves and not to whether the units 106 or 108 receive energy (e.g., electric current) for one or more purposes. For example, the non-powered units 108 may receive electric current to power one or more loads disposed onboard the non-powered units 108. A group or series of units 106, 108 that are coupled with each other to travel as a unit can be referred to as a consist. Additionally or alternatively, several consists of units 106, 108 can be connected with each other to travel as a unit. The routes 102 are interconnected to permit the vehicles 104 to travel over various combinations of the routes 102 to move from a starting location to a destination location. A starting location of a vehicle 104 may be referred to herein as a "first" location, while a destination location of a vehicle 104 may be referred to herein as a "second" location.

In the illustrated embodiment, a first consist 150 and a second consist 152 are traveling in the transportation network 100. In another embodiment, only a single one of the consists 150,152 may be traveling or a greater number of consists 150, 152 may be traveling in the transportation network 100. The first consist 150 includes powered units 160, 162, and 164 positioned in a first powered unit grouping, powered units 170 and 172 positioned in a second powered unit grouping, and powered unit 180 positioned in a third powered unit grouping (of which powered unit 180 is the only powered unit). Thus, a consist may include various groupings of powered units with non-powered units disposed therebetween. The second consist 152 comprises a single powered unit 154. In FIG. 1, the first consist 150 is depicted as traveling in a generally right to left direction, while the second consist 152 is depicted as traveling a generally left to right direction. The powered unit 160 may be considered a lead powered unit of the first consist 150, and the powered unit 180 may be considered a trail powered unit of the first consist 150. The embodiment of FIG. 1 is provided for illustrative purposes only, as other arrangements, orientations, and/or numbers of powered units and/or non-powered cars may be used in other embodiments. In embodiments, the lead powered unit (e.g. powered unit 160 in the illustrated embodiment) may control the operations of other, remote powered units. In other embodiments, a powered unit other than the lead powered unit may act to control the operations of one or more other powered units.

The vehicles 104 may travel along the routes 102 according to a movement plan of the transportation network 100. The movement plan coordinates movement of the vehicles 104 in the transportation network 100. For example, the movement plan may include a schedule for each of the vehicles 104, with the schedules directing the vehicles 104 to move along the routes 102 at associated times. In an embodiment, the movement plan includes a list, table, and/or other logical arrangement of geographic locations (e.g., global positioning system coordinates and/or the like) within the transportation network 100 and associated times. The vehicles 104 move along various paths within the transportation network 100 to arrive at the geographic locations associated with the schedule of each vehicle 104 at the specified times. For example, the movement plan may include schedules for the vehicles 104 to move from a starting location or a current location to a destination location at a scheduled arrival time. Each schedule may dictate a destination location and the scheduled arrival time for a vehicle 104. The schedules may include several scheduled waypoints located between the starting location and the destination location of the vehicle 104, along with scheduled times for the scheduled waypoints. For example, a schedule may include one or more waypoints located along a route between the starting location and the destination location of a vehicle 104. The waypoints may represent one or more intermediate events for the vehicle 104 prior to reaching the destination location at the scheduled arrival time, such as, but not limited to, a location and/or time for the vehicle 104 to stop and refuel.

The movement plan may be determined at least in part by a scheduling system 110. As shown in FIG. 1, the scheduling system 110 can be disposed off-board (e.g., outside) of the vehicles 104. For example, the scheduling system 110 may be disposed at a central dispatch office or other remote location for a railroad company. The scheduling system 110 can create and communicate the schedules to the vehicles 104. The scheduling system 110 can include a wireless antenna 112 (and associated transceiving equipment), such as a radio frequency (RF) or cellular antenna, that wirelessly transmits the schedules to the vehicles 104. For example, the scheduling system 110 may transmit destination locations and associated arrival times to the vehicles 104. Moreover, and for example, the scheduling system 110 may transmit a different list of waypoints and associated scheduled times to each of the vehicles 104.

The vehicles 104 include control systems 114 disposed onboard the vehicles 104. The control systems 114 receive the schedules from the scheduling system 110 and generate control signals that may be used to control propulsion of the vehicles 104 through the transportation network 100. For example, the vehicles 104 may include wireless antennas 116 (and associated transceiving equipment), such as RF or cellular antennas, that receive the schedules from the scheduling system 110. The wireless antenna 116 communicates the received schedule to the control system 114 that may be disposed onboard the vehicle 104. The control system 114 examines the schedule, such as by determining the scheduled destination location and scheduled arrival time, and generates control signals based on the schedule.

For example, the control system 114 may obtain information from the scheduling system 110, such as, but not limited to, the timing of when other vehicle 104 may be traveling along the same route currently being traveled by the vehicle 104, weather conditions, weather forecasts, route conditions encountered and/or reported by other vehicles 104, progress and/or status of construction at construction areas along the route of the vehicle, and/or the like. Moreover, and for example, the control system 114 may have access to positional or distributional information regarding the vehicle 104. Such distributional or positional information may include, but is not limited to, the location of each powered unit in the vehicle 104, the location of a lead powered unit, the location of a trail powered unit, the location and/or type of each non-powered unit of the vehicle 104, the distribution of weight generally along the length of the vehicle, and/or the like. The control system 114 may additionally have access to route and/or geography data regarding the route along which the vehicle 104 is traveling.

The control signals may be used to automatically control tractive efforts and/or braking efforts of the vehicle 104 such that the vehicle 104 self-propels along the routes 102 to the destination location. For example, the control system 114 may be operatively coupled with a propulsion subsystem 118 of the vehicle 104. The propulsion subsystem 118 may include motors (such as traction motors), engines, brakes (such as air brakes and/or dynamic brakes), and/or the like, that generate tractive energy to propel the vehicle 104 and/or slow movement of the vehicle 104. The tractive energy used to propel the vehicle 104 is controlled by a throttle (not shown) of the propulsion subsystem 118. The throttle includes a lowest possible setting (e.g., a fully closed setting) where no tractive energy is generated by the propulsion subsystem 118, an idle setting, and a highest possible setting (e.g., a fully open setting) where the propulsion subsystem 118 generates the greatest amount of tractive energy that the propulsion subsystem 118 is capable of generating. The throttle may have a plurality of discrete settings or may be capable of being smoothly adjusted within a continuous range between the lowest possible setting and the highest possible setting. In the illustrated embodiment of a powered unit 106 that is a rail vehicle, the powered unit 106 may include eight discrete throttle settings, where the throttle setting of "0" is the lowest possible setting and wherein the throttle setting "8" is the highest possible setting.

The braking efforts used to slow the vehicle 104 are at least partially controlled by the dynamic brake of the propulsion subsystem 118 of one or more powered units of the vehicle 104. The dynamic brake may have any structure. For example, the dynamic brake may include a resistor grid and/or the like for dissipating waste electricity as heat. Moreover, and for example, the dynamic brake may include regenerative braking wherein braking electricity is at least partially stored in a battery and/or the like. The dynamic brake includes a lowest possible setting (e.g., a fully closed setting) where no braking effort is generated by the propulsion subsystem 118 to slow the vehicle 104 and a highest possible setting (e.g., a fully open setting) where the propulsion subsystem 118 generates the greatest amount of braking effort that the propulsion subsystem 118 is capable of generating. The dynamic brake may have a plurality of discrete settings or may be capable of being smoothly adjusted within a continuous range between the lowest possible setting and the highest possible setting. In the illustrated embodiment of a powered unit 106 that is a rail vehicle, the powered unit 106 may include eight discrete dynamic brake settings, where the dynamic brake setting of "0" is the lowest possible setting and wherein the dynamic brake setting "8" is the highest possible setting.

The control system 114 may generate control signals that automatically control the propulsion subsystem 118, such as by automatically changing throttle settings and/or brake settings of the propulsion subsystem 118. (Self-propulsion includes automatic operation under the purview of an operator, who may have the option to take over manual control of the vehicle.)

In another embodiment, the control signals may be used to prompt an operator of the vehicle 104 to manually control the tractive efforts and/or braking efforts of the vehicle 104. For example, the control system 114 may include an output device, such as a computer monitor, touchscreen, acoustic speaker, or the like, that generates visual and/or audible instructions based on the control signals. The instructions may direct the operator to manually change throttle settings and/or brake settings of the propulsion subsystem 118.

In one embodiment, one or more of the vehicles 104 includes a display device 130 that visually presents the control instructions to the operator onboard the vehicle 104. For example, a computer monitor or display screen may present textual settings for a throttle or brake setting of the propulsion subsystem 118. The textual settings may prompt the operator to change the tractive effort and/or braking effort of the propulsion subsystem 118, and/or may enable the operator to monitor the automatic (i.e., self-propulsion) operation described above.

The control system 114 and/or the scheduling system 110 may form a trip plan for a trip of the vehicle 104 to travel to a scheduled destination location at a scheduled arrival time. The trip plan may include throttle settings, brake settings, designated speeds, power output, and/or the like, of the vehicle 104 for various segments of the trip of the vehicle 104, for example expressed as a function of time and/or distance along the trip. For example, the trip plan can include one or more velocity curves that designate various speeds of the vehicle 104 along various sections of the routes 102. The trip plan can be formed based on a trip profile associated with an upcoming trip of a vehicle 104.

The trip plan can be used to control the propulsion subsystems 118 of different vehicles 104 to change the tractive and/or braking efforts of the propulsion subsystem 118 as the vehicle 104 travels over different segments of the trip according to the trip plan. For example, if the trip profile requires the vehicle 104 to traverse a steep incline and the trip profile indicates that the vehicle 104 is carrying significantly heavy cargo, then a trip plan may be created that directs the propulsion subsystem 118 of the vehicle 104 to increase the tractive efforts supplied by the propulsion subsystem 118. Conversely, if the vehicle 104 is carrying a smaller cargo load based on the trip profile, then the trip plan may direct the propulsion subsystem 118 to increase the supplied tractive efforts by a smaller amount than the tractive efforts would otherwise be increased if the data indicated a heavier cargo load. The trip plan may additionally or alternatively be formed according to other factors, for example as described below. In one embodiment, the control system 114 includes a software application such as the Trip Optimizer™ system provided by General Electric Company, to control propulsion operations of the vehicle 104 during the trip in order to reduce fuel consumption of the vehicle 104, reduce emissions generated, and/or to reduce wear and tear on the vehicle 104. For a non-limiting example of a trip plan, see U.S. patent application Ser. No. 11/608,257, filed on Dec. 8, 2006, and entitled "METHOD AND APPARATUS FOR OPTIMIZING RAILROAD TRAIN OPERATION FOR A TRAIN INCLUDING MULTIPLE DISTRIBUTED POWER LOCOMOTIVES", which is hereby incorporated by reference in its entirety.

The trip data used to form the trip profile may include any information, such as, but not limited to, vehicle (e.g., train) data, route and/or geography data, scheduling data, an update to vehicle data, an update to route and/or geography data, an update to scheduling data, and/or the like. Vehicle (e.g., train) data includes information about the vehicle and/or cargo being carried by the vehicle. For example, vehicle data may include, but is not limited to, the type of vehicle 104, the model number of the vehicle 104, the manufacturer of the vehicle 104, the horsepower of the vehicle 104, the tractive energy generated by powered units 106 in the vehicle 104, the weight or mass of the vehicle 104 and/or cargo being carried by the vehicle 104, the type of cargo being carried by the vehicle 104, the length and/or other size of the vehicle 104 (e.g., how many powered and non-powered units 106, 108 are mechanically coupled with each other in the vehicle 104), and/or the like. Moreover, and for example, vehicle data may include, but is not limited to, distributional and/or positional information of the vehicle 104, such as, but not limited to, the location of each powered unit in the vehicle 104, the location of a lead powered unit, the location of a trail powered unit, the location and/or type of each non-powered unit in the vehicle 104, the distribution of weight generally along the length of the vehicle, and/or the like.

Route and/or geography data includes information about an upcoming trip of the vehicle 104. For example, the route and/or geography data may include information about the route and/or surface (e.g., the rails of the railroad tracks and/or the like) that the vehicle 104 is or will be traveling on. By way of example, route and/or geography data may include, but is not limited to, the curvature and/or grade (e.g., inclination) of a route and/or various segments of the route, GPS coordinates of the route, the location of crossings and switches along the route, a weather forecast and/or current weather conditions along the route and/or various segments of the route, a change in the route and/or various segments of the route, and/or the like. Moreover, and for example, route and/or geography data may include, but is not limited to, station information (such as, but not limited to, the location of a beginning station where the upcoming trip is to begin and/or the location of an ending station where the upcoming trip is to end), restriction information (such as, but not limited to, work zone identifications, information about locations of damaged segments of the route, locations of route segments that are under repair and/or construction, information on locations of the route that are near another route being repaired, a speed limit of the route and/or various segments of the route, a throttle limitation of the vehicle 104 along the route and/or various segments of the route, a slow order, regulatory requirements (e.g., emission limits) of a region through which the vehicle 104 travels along the route, and/or the like), and/or the like.

Scheduling data may include, but is not limited to, the timing of when other vehicles 104 may be traveling along the same route currently being traveled by the vehicle 104, weather conditions, weather forecasts, route conditions encountered and/or reported by other vehicles 104, progress and/or status of construction at construction areas along the route, and/or the like. Other types of trip data besides the vehicle data, route and/or geography data, and/or scheduling data described above can be additionally or alternatively used as part of a trip profile to create and/or revise a trip plan.

Figure 2:
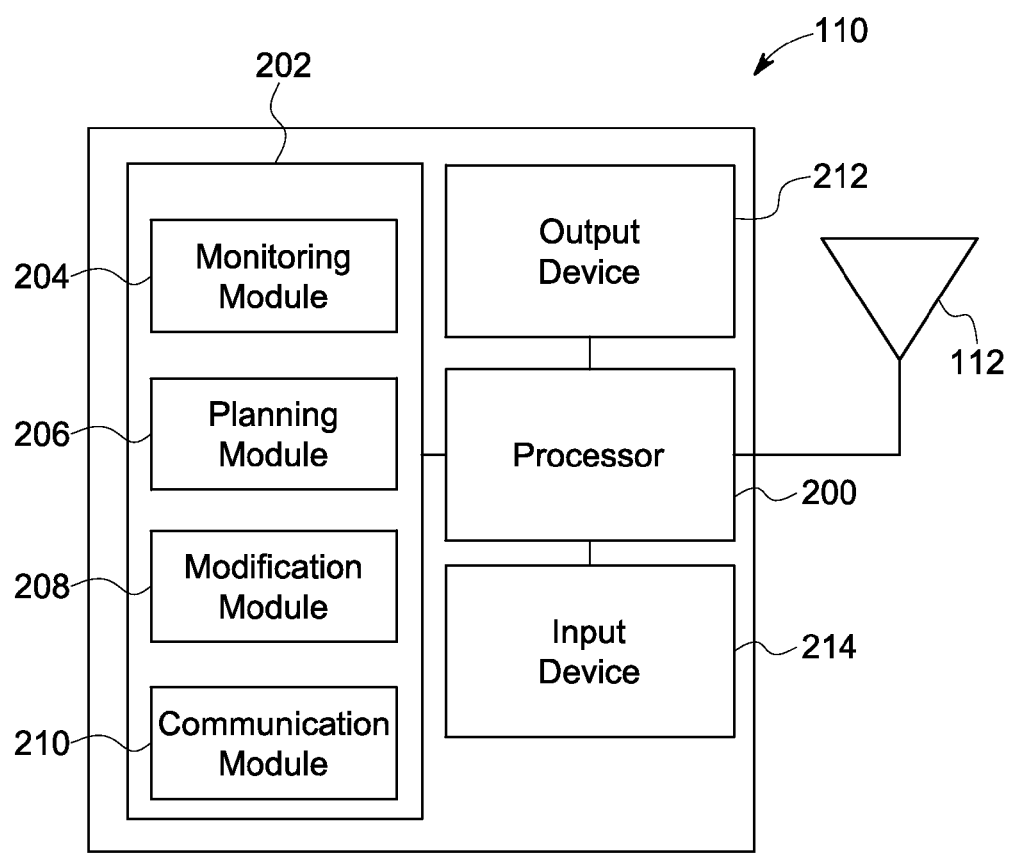
FIG. 2 is a schematic diagram of a scheduling system of the transportation network shown in FIG. 1 according to an embodiment of the inventive subject matter described herein.

FIG. 2 is a schematic diagram of the scheduling system 110 according to an embodiment of the inventive subject matter described herein. The scheduling system 110 includes a processor 200 (e.g., a computer processor, microprocessor, controller, microcontroller, or other logic-based computer device) that is communicatively coupled with a tangible and non-transitory computer readable storage medium 202, such as a computer hard drive, flash drive, RAM, ROM, EEPROM, and the like. The storage medium 202 includes one or more sets of instructions that direct the processor 200 to perform various operations or steps. For example, the storage medium 202 can include software applications. In the illustrated embodiment, the sets of instructions are shown as a monitoring module 204, a planning module 206, a modification module 208, and a communication module 210. Alternatively, one or more of the monitoring module 204, the planning module 206, the modification module 208, and/or the communication module 210 may be embodied in a processor similar to the processor 200. For example, one or more of the modules 204, 206, 208, 210 may each be a dedicated processor or application specific integrated circuit (ASIC).

An output device 212 is communicatively coupled with the processor 200. The output device 212 presents information to an operator of the scheduling system 110, such as schedules of vehicles 104 (shown in FIG. 1), adherence of the vehicles 104 to the schedules, throughput parameters (described below) of the transportation network 102 (shown in FIG. 1), and the like. By way of example, the output device 212 may include a computer monitor, touchscreen, a printer, a speaker, and/or the like. An input device 214 is communicatively coupled with the processor 200. The input device 214 receives information from the operator and communicates the information to the processor 200. The operator may control operation of the scheduling system 110 using the input device 214. By way of example, the input device 214 may include a keyboard, electronic mouse device, stylus, touchscreen, microphone, and/or the like.

The monitoring module 204 monitors the vehicles 104 (shown in FIG. 1) as the vehicles 104 travel through the transportation network 100 (shown in FIG. 1). The monitoring module 204 can track locations of the vehicles 104. For example, each of the vehicles 104 may periodically transmit the actual locations and/or times at which the actual locations are determined to the antenna 112 of the scheduling system 110. The actual locations and times of the vehicles 104 can be conveyed to the monitoring module 204 so that the monitoring module 204 can determine where the various vehicles 104 are located within the transportation network 100.

The planning module 206 creates schedules for the vehicles 104 and transmits the schedules to the control systems 114 (shown in FIG. 1) of the vehicles 104. For example, the planning module 206 may convey the schedules to the antenna 112 (shown in FIG. 1), which transmits the schedules to the antennas 116 of the corresponding vehicles 104. In an embodiment, the planning module 206 may modify a previously created schedule that previously was sent to a vehicle 104.

In an embodiment, the planning module 206 creates and/or revises the trip plans for the vehicles 104. For example, the planning module 206 can receive a trip profile and create a trip plan of operational settings (e.g., throttle settings, brake settings, designated speeds, power output, and/or the like) for the vehicle, for example expressed as a function of time and/or distance along a trip. Moreover, and for example, the planning module 206 can receive an updated trip profile and revise an existing trip plan of operational settings (e.g., throttle settings, brake settings, designated speeds, power output, and/or the like) for the vehicle 104. The vehicle 104 can use the trip plan to set, control, and/or recommend actual operational settings of the vehicle. Different trip plans for different vehicles 104 and/or different trips can be created and/or revised. A movement plan of the transportation network 100 may include a combination of one or more trip plans and one or more schedules.

As the vehicles 104 travel in the transportation network 100, one or more vehicles 104 may deviate from the movement plan by moving ahead or behind in the associated schedule. For example, adverse weather conditions, degraded health of the vehicles, breakdowns, and/or the like may cause one or more vehicles 104 to fall behind schedule. The modification module 208 can revise the trip plan for one or more of the vehicles 104. For example, if a vehicle 104 is too far behind schedule, the modification module 208 may revise the trip plan of the vehicle 104 and/or create a new trip plan for the vehicle 104.

Figure 3:
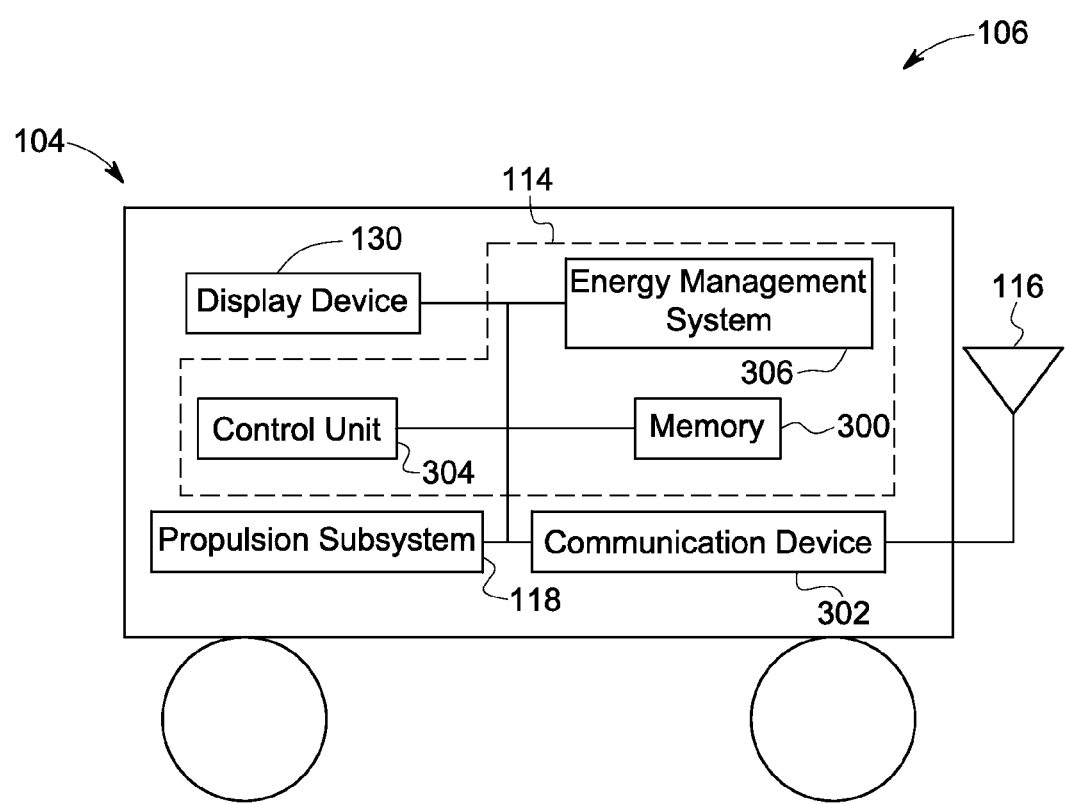
FIG. 3 is a schematic illustration of a powered unit of a vehicle traveling within the transportation network shown in FIG. 1 according to an embodiment of the inventive subject matter described herein.

FIG. 3 is a schematic illustration of a powered unit 106 of a vehicle 104 traveling within the transportation network 100 (shown in FIG. 1) according to an embodiment of the inventive subject matter described herein. The powered unit 106 includes the antenna 116, the control system 114, the propulsion subsystem 118, the display device 130, and a memory 300. The memory 300 may include a tangible and non-transitory computer readable storage medium, such as, but not limited to, a computer hard drive, flash drive, RAM, ROM, EEPROM, and/or the like. The memory 300 can include one or more sets of instructions that direct the control system 114 to perform various operations or steps. For example, the memory 300 can include software applications.

In the illustrated embodiment, the powered unit 106 includes a communication device 302 that is communicatively coupled with the antenna 116 for communicating data with off-board components. For example, the communication device 302 can include a transceiver device that wirelessly transmits and receives data messages. The communication device 302 may convey the data to the display device 130 for presentation of the data to the operator of the powered unit 106 and/or to the control system 114 (e.g., for use in determining tractive efforts and/or braking efforts to be provided by the powered unit 106).

The control system 114 includes a control unit 304 and an energy management system (EMS) 306. The control unit 304 may represent a hardware and/or software system that operates to perform one or more functions to control operations of the powered unit 106. For example, the control unit 304 may include one or more computer processors, controllers, and/or other logic-based devices that perform operations based on instructions stored on the memory 300 for controlling tractive efforts and/or braking efforts of the powered unit 106. Alternatively, the control unit 304 may include a hard-wired device that performs operations based on hard-wired logic of the device. For example, the control unit 304 may be a dedicated processor and/or application specific integrated circuit (ASIC). The control unit 304 shown in FIG. 3 may represent the hardware that operates based on software or hardwired instructions, the software that directs hardware to perform the operations, or a combination thereof.

The control unit 304 can receive data messages from the scheduling system 110 (shown in FIG. 1) via the communication device 302 and use information included in the data messages to control and/or change tractive efforts and/or braking efforts of the powered unit 106 based on the information. For example, the control unit 304 may receive trip plans and/or revised trip plans from the scheduling system 110. The control unit 304 may be referred to herein as a "vehicle control unit".

The EMS 306 may represent a hardware and/or software system that operates to perform one or more functions to control operations of the powered unit 106. For example, the EMS 306 may include one or more computer processors, controllers, and/or other logic-based devices that perform operations based on instructions stored on the memory 300. Alternatively, the EMS 306 may include a hard-wired device that performs operations based on hard-wired logic of the device. For example, the EMS 306 may be a dedicated processor and/or application specific integrated circuit (ASIC). The EMS 306 shown in FIG. 3 may represent the hardware that operates based on software or hardwired instructions, the software that directs hardware to perform the operations, or a combination thereof. Although the EMS 306 is shown as being located onboard the vehicle 104, the EMS 306 may be additionally or alternatively located at the central dispatch office and/or another location off-board the vehicle 104.

In an embodiment, the EMS 306 creates and/or revises the trip plans for the corresponding vehicle 104 (i.e., the vehicle 104 that includes the powered unit 106 shown in FIG. 3). For example, the EMS 306 can receive a trip profile and create a trip plan of operational settings (e.g., throttle settings, brake settings, designated speeds, power output, and/or the like) for the vehicle, for example expressed as a function of time and/or distance along a trip. Moreover, and for example, the EMS 306 can receive an updated trip profile and revise an existing trip plan of operational settings (e.g., throttle settings, brake settings, designated speeds, power output, and/or the like) for the corresponding vehicle 104. In an embodiment, the scheduling system 110 sends a scheduled destination and/or a scheduled arrival time to the EMS 306, and the EMS 306 creates the trip plan for the vehicle based on the information received from the scheduling system 110. The EMS 306 conveys the trip plan to the control unit 304 of the corresponding vehicle 104. As described above, the trip plan may be formed based on a trip profile for the vehicle and may dictate tractive efforts and/or braking efforts for different portions of the trip. The EMS 306 may revise the trip plan when an updated schedule information is received from the scheduling system 110. For example, if an updated destination and/or updated arrival time is received from the scheduling system 110, then the EMS 306 may revise the trip plan to require lower speed and/or tractive efforts from the powered rail vehicles in the vehicle to arrive at a later time for the updated event than the original time and/or to arrive at a closer location for the updated meet event than the original location.

The trip plan may include control instructions for controlling (e.g., setting, maintaining, changing, and/or the like) the tractive effort and/or braking effort of the propulsion subsystem 118. The control unit 304 can receive the trip plan from the EMS 306 and automatically control the tractive effort and/or braking effort of the propulsion subsystem 118 accordingly using the control instructions of the trip plan. For example, if a revised trip plan dictates that a lower speed is to be used to arrive at the updated meet event, then the control unit 304 can direct the propulsion subsystem 118 to reduce the tractive effort provided by the propulsion subsystem 118. Alternatively, the control unit 306 uses the control instructions provided within the trip plan to indicate (e.g., using a display, audible indications, and/or the like) control commands that direct an operator of the powered unit 106 to control the tractive effort and/or braking effort supplied by the propulsion subsystem 118.

Figure 4:
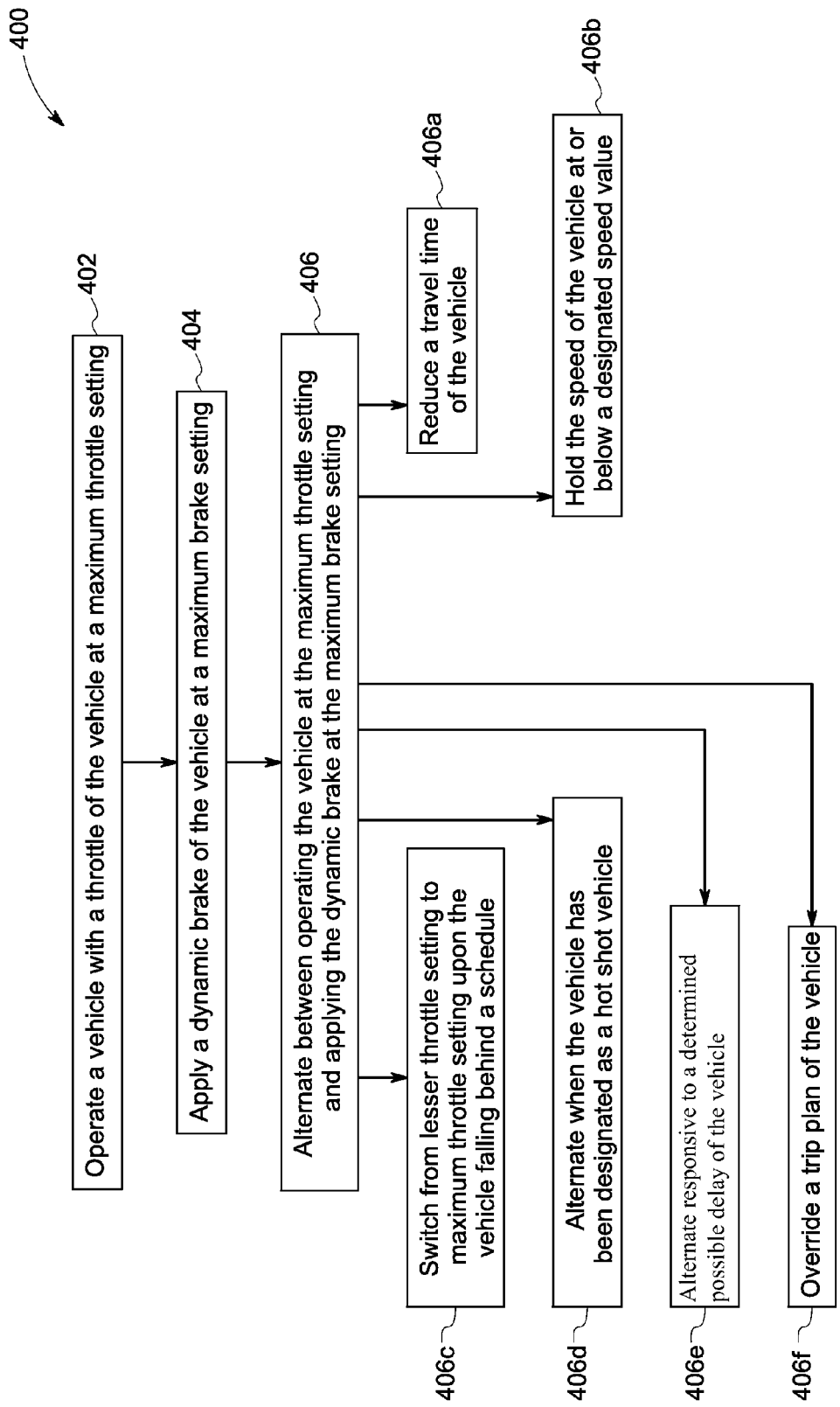
FIG. 4 is a flowchart of a method according to an embodiment of the inventive subject matter described herein.

FIG. 4 is flowchart of one embodiment of a method 400 according to an embodiment of the inventive subject matter described herein. The method 400 may be performed, for example, in association with one or more of the vehicles 104 (shown in FIGS. 1 and 3) traveling within the transportation network 100 (shown in FIG. 1). The method 400 may be preformed by a system including a control unit, an EMS, and/or an off-board location (e.g., a scheduling system). For example, the method 400 may be preformed by a system that includes the control unit 304 (shown in FIG. 3), the EMS 306 (shown in FIG. 3), and/or the scheduling system 110 (shown in FIGS. 1 and 2). As described above, the scheduling system 110 may be located at a central dispatch office of the transportation network 100, or may be located at another facility that is remote from (e.g., off-board) the vehicle 104.

The method 400 includes operating, at 402, the vehicle with a throttle of the vehicle at a maximum throttle setting. At 404, the method 400 includes applying a dynamic brake of the vehicle at a maximum brake setting of the dynamic brake. At 406, the method 400 includes alternating between operating the vehicle with the throttle at the maximum throttle setting and applying the dynamic brake of the vehicle at the maximum brake setting along a route being traveled by the vehicle within the transportation network.

The maximum throttle setting of the throttle corresponds to one or more designated safe operating limits of the vehicle along the particular segment of the route being traveled by the vehicle. Specifically, the maximum throttle setting is a setting of the throttle wherein the speed of the vehicle is within one or more designated safe operating limits of the vehicle. Designated safe operating limits of the vehicle include, but are not limited to, a speed limit of the vehicle within a region of the transportation network within which the vehicle is traveling, a speed at which the vehicle may experience damage when the vehicle exceeds such a speed, a speed above which operation of the vehicle is unsafe, and/or the like. For example, speeds above which the vehicle may experience damage include, but are not limited to, a speed at which components of the vehicle may be more likely to malfunction and/or fail when such a speed is exceeded by the vehicle, a speed at which a group of interconnected rail vehicles (e.g., a train, a consist, etc.) may be more likely break apart from each other when the group of rail vehicles exceeds such a speed, and/or the like. Moreover, and for example, speeds above which operation of the vehicle is unsafe include, but are not limited to, a speed above which an operator or an automated control system (e.g., the control unit 304 shown in FIG. 3) may lose control of the vehicle, a speed above which a rail vehicle may derail from a railroad track, a speed above which an operator may no longer be able to pay adequate attention to traffic signals (e.g., traffic signs, traffic lights, and/or the like), and/or the like.

In an embodiment, the designated safe operating limit of the vehicle may change depending on weather conditions and/or the condition of the route (e.g., the condition of a railroad track, a road, and/or the like) and/or the like. The maximum throttle setting operated at 402 may therefore be based on such weather conditions, route conditions, and/or the like. Optionally, the maximum throttle setting operated at 402 is less, by a factor of safety, than a setting of the throttle where the vehicle obtains a speed that is outside (i.e., exceeds) the designated safe operating limit.

The maximum throttle setting at which the vehicle is operated at 402 may be the highest possible setting of the throttle of the vehicle. For example, the maximum throttle setting operated at 402 is the highest possible setting of the throttle when the highest speed obtained by the vehicle at the highest possible throttle setting is within the designated safe operating limit. The maximum throttle setting at which the vehicle is operated at 402 is a lower setting than the highest possible setting of the throttle when the highest speed obtained by the vehicle at the highest possible throttle setting exceeds the designated safe operating limit. In an embodiment wherein the vehicle is a rail vehicle and the maximum throttle setting is the highest possible setting of the throttle, the maximum throttle setting may be a discrete throttle setting of "8".

A control unit (e.g., the control unit 304 shown in FIG. 3) located onboard the vehicle may automatically determine the maximum throttle setting of the throttle. For example, the control unit may automatically determine the maximum throttle setting based on the designated safe operating limit, route and/or geography data of the particular segment of the route being traveled by the vehicle, and/or the like. Determining the maximum throttle setting based on the designated safe operating limit, route and/or geography data of the particular segment of the route being traveled by the vehicle, and/or the like may enable the control unit to select a maximum throttle setting that maintains the speed of the vehicle at or below a speed limit, prevents damage to the vehicle, and/or the maintains safe operation of the vehicle. For example, determining the maximum throttle setting based on the designated safe operating limit, route and/or geography data of the particular segment of the route being traveled by the vehicle, and/or the like may enable the control unit to select a maximum throttle setting that prevents a group of interconnected rail vehicles from breaking apart from each other and/or from derailing from a railroad track. In an alternative embodiment, the operator of the vehicle determines the maximum throttle setting, such as, but not limited to, by viewing a posted speed limit and selecting the throttle setting that enables the vehicle to maintain a speed that is approximately equal to or slightly below the posted speed limit.

The vehicle may be automatically operated at 402 with the throttle at the maximum throttle setting using the control unit. Alternatively, the vehicle is manually operated at 402 with the throttle at the maximum throttle setting by an operator. For example, in embodiments wherein the maximum throttle setting is automatically determined by the control unit, the maximum throttle setting may be automatically communicated to the operator of the vehicle (e.g., using the display device 130 shown in FIG. 3), who then manually operates at 402 the vehicle with the throttle at the maximum throttle setting.

The maximum brake setting of the dynamic brake also corresponds to one or more designated safe braking limits of the vehicle along the particular segment of the route being traveled by the vehicle. Specifically, the maximum brake setting is a setting of the dynamic brake wherein the braking force applied by the dynamic brake is within one or more designated safe braking limits of the vehicle. Designated safe braking limits of the vehicle include, but are not limited to, braking forces above which the vehicle may experience damage, braking forces above which operation of the vehicle is unsafe, and/or the like. For example, braking forces above which the vehicle may experience damage include, but are not limited to, braking forces above which components of the vehicle may be more likely to malfunction and/or fail, braking forces above which a group of interconnected rail vehicles (e.g., a train, a consist, etc.) may be more likely break apart from each other, and/or the like. Moreover, and for example, braking forces above which operation of the vehicle is unsafe include, but are not limited to, braking forces above which a rail vehicle or a group of interconnected rail vehicles may derail from a railroad track, and/or the like.

In an embodiment, the designated safe braking limit of the vehicle may change depending on weather conditions and/or the condition of the route (e.g., the condition of a railroad track, a road, and/or the like) and/or the like. The maximum brake setting applied at 404 may therefore be based on such weather conditions, route conditions, and/or the like. Optionally, the maximum brake setting applied at 404 is less, by a factor of safety, than a setting of the dynamic brake where the braking forces are outside (i.e., exceed) the designated safe braking limit.

The maximum brake setting that is applied at 404 may be the highest possible setting of the dynamic brake of the vehicle. For example, the maximum brake setting applied at 404 is the highest possible setting of the dynamic brake when the highest braking forces generated at the highest possible setting of the dynamic brake are within the designated safe braking limit. The maximum brake setting of the dynamic brake that is applied at 404 is a lower setting than the highest possible setting of the dynamic brake when the highest braking forces generated at the highest possible setting of the dynamic brake exceed the designated safe braking limit. In an embodiment wherein the vehicle is a rail vehicle and the maximum brake setting is the highest possible setting of the dynamic brake, the maximum brake setting may be a discrete throttle setting of "8".

The control unit located onboard the vehicle may automatically determine the maximum brake setting of the dynamic brake. For example, the control unit may automatically determine the maximum brake setting based on a current or most recently known speed of the vehicle, the designated safe braking limit, route and/or geography data of the particular segment of the route being traveled by the vehicle, and/or the like. Determining the maximum brake setting based on the current or most recently known speed of the vehicle, the designated safe braking limit, route and/or geography data of the particular segment of the route being traveled by the vehicle, and/or the like may enable the control unit to select a maximum brake setting that prevents damage to the vehicle and/or the maintains safe operation of the vehicle. For example, determining the maximum brake setting based on the current or most recently known speed of the vehicle, the designated safe braking limit, route and/or geography data of the particular segment of the route being traveled by the vehicle, and/or the like may enable the control unit to select a maximum brake setting that prevents a group of interconnected rail vehicles from derailing from a railroad track.

The dynamic brake may be automatically applied at 404 at the maximum brake setting using the control unit. Alternatively, the dynamic brake is manually applied at 404 at the maximum brake setting by an operator. For example, the maximum brake setting may be automatically communicated to the operator of the vehicle (e.g., using the display device 130 shown in FIG. 3), who then manually applies at 404 the dynamic brake at the maximum brake setting.

The method steps 402 and 404 may be alternated at 406 along any amount and along any segment(s) of the route of the vehicle within the transportation network. In other words, the method steps 402 and 404 may be alternated at 406 for any amount and any portions of a trip of the vehicle within the transportation network. Each duration of time that the method step 402 is performed during the alternating at 406 may have any value. The duration of time that the method step 402 is performed may be approximately consistent or may be variable during the alternating at 406. Each duration of time that the method step 404 is performed during the alternating at 406 may have any value. The duration of time that the method step 404 is performed may be approximately consistent or may be variable during the alternating at 406.

The method step 402 enables the vehicle to operate at the maximum throttle setting, which enables the vehicle to operate at the maximum speed that is within the designated safe operating limits of the vehicle along the particular segment of the route being traveled by the vehicle. The dynamic brake can be applied at 404 when it is desired to bring the vehicle to a stop or slow the speed of the vehicle to within the designated safe operating limits. For example, the vehicle may be required to come to a stop at various locations along the route, such as, but not limited to, at stop signs, stop lights, yield signs and/or lights, and/or the like. Moreover, and for example, the vehicle may need to slow at various locations along route, such as, but not limited to, locations where the designated safe operating limit changes, traffic locations (e.g., yield signs, merge locations, and/or the like), switching locations between different tracks, roads, paths, and/or the like, and/or the like. Examples of locations where the designated safe operating limit changes include, but are not limited to, locations where a posted speed limit changes, track, road, and/or path changes (e.g., changes in condition, geography changes such as, but not limited to, changes in grade, changes in direction, changes in corner radius, and/or the like, and/or the like), weather changes, changes in the track, road, path, and/or the vehicle that change the speed at which the vehicle may experience damage and/or that change the speed at which operation of the vehicle is unsafe, and/or the like.

In some embodiments, the method steps 402 and 404 are alternated at 406a to reduce a travel time of the trip of the vehicle within the transportation network, for example as compared to operating the vehicle at one or more other throttle settings than the maximum throttle setting. Specifically, in some circumstances, the vehicle may need to travel as fast as possible along the route (or along a segment of the route) that the vehicle 104 is traveling along such that the vehicle traverses the segment and/or route in the shortest time possible, for example with no regard to the efficiency (e.g., fuel consumption, emissions, and/or the like) of the trip. The speed obtained by the vehicle when the vehicle is operated at 402 at the maximum throttle setting may be higher than a speed value used by the vehicle when the vehicle is attempting to increase the efficiency of a trip, for example by reducing fuel consumption, reducing emissions, and/or the like. Operating at 402 the vehicle at the maximum throttle setting enables the vehicle to operate at the higher speed (e.g., the maximum speed that is within the designated safe operating limits), for example as compared to operating the vehicle at a lower setting of the throttle. By applying at 404 the dynamic brake at the maximum brake setting (whether when bringing the vehicle to a stop or merely slowing the vehicle), the amount of the time and/or distance that the vehicle spends slowing to a stop is reduced, for example as compared to applying a lesser setting of the dynamic brake than the maximum brake setting. The vehicle can then spend more time and/or distance along the route (or along the segment of the route) at the maximum throttle setting, and therefore at the higher speed provided by the maximum throttle setting, for example as compared to operating the vehicle at a lesser setting of the throttle and applying a lesser setting of the dynamic brake than the maximum brake setting. By alternating at 406a the method steps 402 and 404 in such a manner, the method 400 may reduce a travel time of the vehicle over the entire route and/or along one or more segments of the route. Accordingly, the method 400 may be used when reducing a travel time of the vehicle is more important than increasing an efficiency of the vehicle.

One specific example of using the method 400 to reduce a travel time of the vehicle between two stop locations includes alternating at 406a the method steps 402 and 404 along a segment that extends between the stop locations such that the vehicle operates at the maximum speed that is within the designated safe operating limits for the maximum amount of time and/or distance between the stop locations. Specifically, by applying at 404 the dynamic brake at the maximum brake setting, the amount of the segment between the stop locations along which the vehicle spends slowing to a stop is reduced, for example as compared to applying a lesser setting of the dynamic brake than the maximum brake setting. The vehicle can then spend more time and/or distance of the trip along the segment between the stop locations at the maximum throttle setting and therefore at the maximum speed that is within the designated safe operating limits, for example as compared to applying a lesser setting of the throttle and a lesser setting of the dynamic brake.

In some embodiments, the method steps 402 and 404 are alternated at 406b to hold a speed of the vehicle at or below a designated speed value in one or more locations along the route of the vehicle, for example when it is desired to slow the speed of the vehicle to within the designated safe operating limits. For example, during the alternating at 406b, the dynamic brake may be applied at 404 at the maximum brake setting responsive to a change in the designated safe operating limits in one or more locations along the route of the vehicle. Such application at 404 of the dynamic brake slows the vehicle to hold the vehicle at or below the designated speed value such that the vehicles speed is within the updated designated safe operating limits. Examples of locations where the designated safe operating limit changes include, but are not limited to, locations where a posted speed limit changes, track, road, and/or path changes (e.g., changes in condition, geography changes such as, but not limited to, changes in grade, changes in condition, changes in direction, changes in corner radius, and/or the like, and/or the like), weather changes, changes in the track, road, path, and/or the vehicle that change the speed at which the vehicle may experience damage and/or that change the speed at which operation of the vehicle is unsafe, and/or the like.

Holding the vehicle at the designated speed value, and thus within the designated safe operating limits, may enable the vehicle to travel as fast as possible without disobeying designated speed limits along the route. Optionally, the designated speed value is less than the actual speed limit by a factor of safety. Holding the vehicle at the designated speed value, and thus within the designated safe operating limits, may enable the vehicle to avoid damage. Specifically, the designated speed value may be a value at which the vehicle may experience damage when the vehicle exceeds such a speed. For example, the designated speed value may be a speed at which components of the vehicle may be more likely to malfunction and/or fail when such a speed is exceeded by the vehicle. Moreover, and for example, the designated speed value may be a speed at which a group of interconnected rail vehicles (e.g., a train, a consist, etc.) may be more likely break apart from each other when the group of rail vehicles exceeds such a speed. Accordingly, during the alternating at 406*b*, the dynamic brake may be applied at 404 at the maximum brake setting to hold the speed of the vehicle at or below the designated speed value to prevent damage to the vehicle, which may enable the vehicle to travel as fast as possible without damaging components of the vehicle. In an embodiment wherein the vehicle consists of a group of interconnected rail vehicles, holding the speed of the vehicle at or below the designated speed value may enable the vehicle to travel as fast as possible without causing the group of interconnected rail vehicles to break apart from each other. Optionally, the designated speed value is less, by a factor of safety, than the speed at which the vehicle may experience damage when exceeded.

Holding the vehicle at the designated speed value, and thus within the designated safe operating limits, may enable the vehicle to remain below a speed above which operation of the vehicle is unsafe. For example, speeds above which operation of the vehicle is unsafe include, but are not limited to, a speed above which an operator or an automated control system (e.g., the control unit 304 shown in FIG. 3) may lose control of the vehicle, a speed above which a rail vehicle or group of interconnected rail vehicles may derail from a railroad track, a speed above which an operator may no longer be able to pay adequate attention to traffic signals (e.g., traffic signs, traffic lights, and/or the like), and/or the like. Accordingly, during the alternating at 406*b*, the dynamic brake may be applied at 404 at the maximum brake setting to hold the speed of the vehicle at or below the designated speed value, which may enable the vehicle to travel as fast as possible without derailing, without losing control, and/or without causing a traffic accident. Optionally, the designated speed value is less, by a factor of safety, than the speed above which operation of the vehicle is unsafe.

The alternating at 406 of the method steps 402 and 404 may be performed manually by an operator of the vehicle or may be performed automatically by the control unit located onboard the vehicle. In an exemplary embodiment, the alternating at 406 of the method steps 402 and 404 is performed automatically by the vehicle control unit, for example at a rate that is faster than is controllable by a human operator.

The alternating at 406 of the method steps 402 and 404 may be performed for any reason(s) and/or responsive to the occurrence of any condition(s). For example, the alternating at 406 of the method steps 402 and 404 may be performed in response to the vehicle falling behind a schedule of a trip of the vehicle within the transportation network. For example, the method 400 may include, at 406*c*, switching from operating the vehicle at another throttle setting that produces less propulsive output than the maximum throttle setting to the maximum throttle setting in response to the vehicle falling behind schedule. Switching at 406*c* includes alternating operation of the vehicle at the maximum throttle setting with application at 404 of the dynamic brake at the maximum brake setting when it is desired to stop or slow the vehicle. The method 400 may thus enable the vehicle to travel at an increased speed along one or more segments of the remainder of the route of the vehicle to thereby make up time in the schedule (e.g., compensate for the delay that caused the vehicle to fall behind schedule). The method 400 may therefore enable the vehicle to arrive at the destination location, and/or at one or more intermediate waypoints, at the scheduled arrival time despite falling behind schedule earlier in the trip.

The occurrence of the vehicle falling behind schedule may be determined in any manner and using any component(s). For example, an EMS (e.g., the EMS 306 shown in FIG. 3) onboard the vehicle may compare the current location and time of the vehicle to a received schedule and/or trip plan to determine if the vehicle is behind schedule (e.g., is and/or will be arriving at a scheduled waypoint after a scheduled arrival time). In addition or alternatively to the EMS, a monitoring module (e.g., the monitoring module 204 shown in FIG. 2), a planning module (e.g., the planning module 206 shown in FIG. 2), and/or a modification module (e.g., the modification module 208 shown in FIG. 2) of a scheduling system (e.g., the scheduling system 110 shown in FIGS. 1 and 2) may determine that the vehicle is behind schedule.

One example of alternating at 406*c* when the vehicle falls behind schedule includes alternating at 406*c* for an entirety of the remainder of the trip of the vehicle (i.e., along all of the remaining segments of the route of the vehicle). Another example of alternating at 406*c* when the vehicle falls behind schedule includes alternating at 406*c* along only one or some of the remaining segments of the route of the vehicle. For example, the vehicle may fall behind schedule such that the vehicle is no longer scheduled to arrive at a waypoint within the transportation network before another vehicle, which may cause the vehicles to arrive at the waypoint at the same time and thereby possibly collide with each other. Accordingly, the method 400 may include alternating at 406*c* along one or more segments of the route that are upstream from the waypoint such that the vehicle arrives at, and passes through, the waypoint before the other vehicle arrives at the waypoint. The method 400 may thus enable the vehicle to travel at an increased speed along one or more segments before reaching a waypoint to thereby make up time in the schedule and arrive at the waypoint before another vehicle arrives at the waypoint, which may enable the vehicle to avoid a collision with the other vehicle.

One example of a reason for alternating at 406 the method steps 402 and 404 includes the vehicle being designated as a hot shot vehicle, which is a relatively fast, non-stop, vehicle that is given priority within the transportation network. Accordingly, the method 400 may include alternating at 406*d* when the vehicle has been designated as a hot shot vehicle. The method 400 may thus enable a vehicle that is given priority within the transportation network to travel non-stop at the highest possible speed that is within legal and designated safe operating limits.

Another example of a reason for alternating at 406 the method steps 402 and 404 includes hedging against a possible delay later in the trip of the vehicle. For example, unknown constraints that cause the vehicle to travel at a reduced speed (including complete stoppage) may develop and become known during the trip of the vehicle. Examples of such unknown constraints include, but are not limited to, weather conditions, route conditions, traffic delays, and/or the like. The method 400 may thus include alternating at 406*e* along one or more first segments of the route of the vehicle responsive to a determined possible delay of the vehicle within one or more second segments of the trip that are subsequent to the first segment(s). The method 400 may therefore enable the vehicle to travel at a faster speed along one or more segments of the route to compensate for one or more downstream segments of the route where the vehicle may have to travel at a reduced speed.

In an embodiment, the method 400 may include overriding a trip plan of the vehicle. For example, the trip plan of the vehicle may designate that the vehicle travels at a particular speed during one or more particular segments of the route of the vehicle. But, the reason(s) and/or condition(s) that initiate the alternating at 406 may call for an increased speed as compared to the particular speed designated by the trip plan. Accordingly, alternating at 406 may include overriding, at 406f, the trip plan of the vehicle. The trip plan may be overridden at 406f along an entirety of the route of the vehicle or along only one or some of the segments of the route. For example, in some embodiments, the trip plan is initially overridden at 406f at one or more intermediate locations along the route and is thereafter overridden at 406f for the remainder of the segments of the route.

It should be understood that the method 400 may include any combination of the steps 406a, 406b, 406c, 406d, 406e, and/or 406f.

Figure 5:
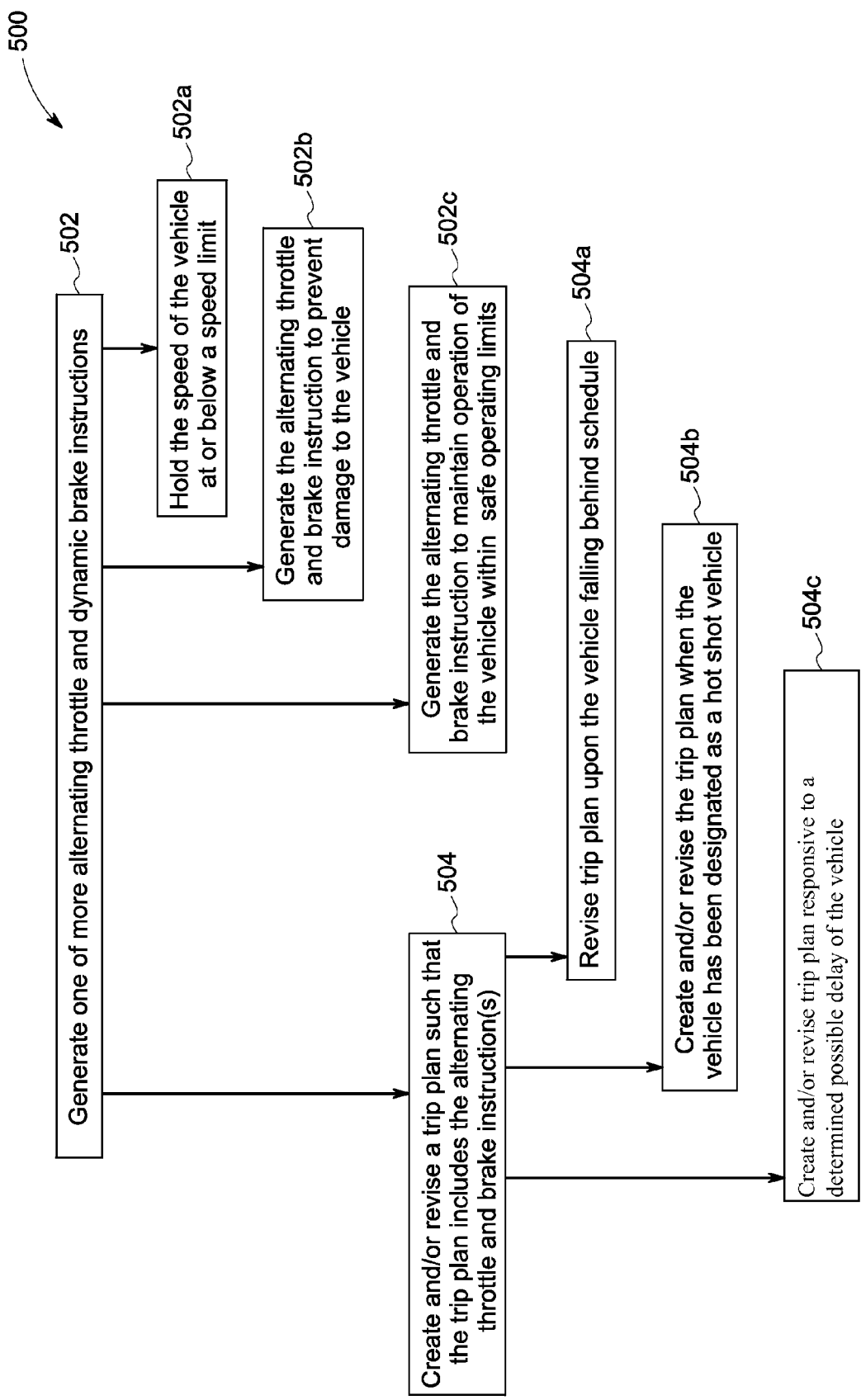
FIG. 5 is a flowchart of a method according to an embodiment of the inventive subject matter described herein.

FIG. 5 is flowchart of one embodiment of a method 500 according to an embodiment of the inventive subject matter described herein. The method 500 may be performed, for example, in association with one or more of the vehicles 104 (shown in FIGS. 1 and 3) traveling within the transportation network 100 (shown in FIG. 1). The method 500 may be preformed by a system including a control unit, an EMS, and/or an off-board location (e.g., a scheduling system). For example, the method 400 may be preformed by a system that includes the control unit 304 (shown in FIG. 3), the EMS 306 (shown in FIG. 3), and/or the scheduling system 110 (shown in FIGS. 1 and 2). As described above, the scheduling system 110 may be located at a central dispatch office of the transportation network 100, or may be located at another facility that is remote from (e.g., off-board) the vehicle 104.

The method 500 includes generating, at 502, one or more alternating throttle and dynamic brake instructions for the vehicle that instructs to alternate between operating the vehicle with a throttle of the vehicle at a maximum throttle setting and applying a dynamic brake of the vehicle at a maximum brake setting of the dynamic brake along the route being traveled by the vehicle, for example as is described above with respect to the method 400 (shown in FIG. 4). The alternating throttle and dynamic brake instruction may instruct to alternate the between the maximum throttle setting and the maximum dynamic brake setting along any amount and along any segments of the route of the vehicle within the transportation network. For example, the alternating throttle and dynamic brake instruction may instruct to alternate the between the maximum throttle setting and the maximum dynamic brake setting along an entirety of the route of the vehicle (such as, but not limited to, when the vehicle is a hot shot train and/or the like), or to alternate the between the maximum throttle setting and the maximum dynamic brake setting along one or more segments of the route of the vehicle.

The alternating throttle and dynamic brake instruction may be automatically generated at 502 onboard the vehicle (e.g., by the EMS 304 shown in FIG. 3) and/or may be automatically generated at 502 at a remote location from the vehicle (e.g., by one or more modules 204, 206, and/or 208 shown in FIG. 2 of the scheduling system 110 shown in FIGS. 1 and 2).

The method 500 also includes creating and/or revising, at 504, a trip plan of a trip of the vehicle within the transportation network such that the trip plan includes the alternating throttle and dynamic brake instruction(s) for one or more segments of the trip. When the trip plan is revised at 504, the trip plan may be revised during the trip and/or may be revised before the trip of the vehicle is initiated. The trip plan may be automatically created and/or revised at 504 onboard the vehicle (e.g., by the EMS 304) and/or may be automatically created and/or revised at 504 at a remote location from the vehicle (e.g., by one or more modules 204, 206, and/or 208 of the scheduling system 110). Alternatively, the trip plan is manually created and/or revised at 504 by an operator of the vehicle.

The alternating throttle and dynamic brake instruction may be used to reduce a travel time of the vehicle over the entire route and/or along one or more segments of the route, for example as described above with respect to the method 400. Accordingly, the method 500 may be used to create and/or revise trip plans when reducing a travel time of the vehicle is more important than increasing an efficiency of the vehicle. In an embodiment, the determination that reducing the travel time of the vehicle is more important than increasing the efficiency of the vehicle is made during the trip of the vehicle and the trip plan of the vehicle for the trip is revised at 504 to include the alternating throttle and dynamic brake instruction. For example, in some embodiments, the method 500 includes: creating a first trip plan that does not include the alternating throttle and dynamic brake instruction and that results in improved fuel economy and/or reduced emissions relative to controlling the vehicle without the first trip plan; and revising at 504 the first trip plan to include the alternating throttle and dynamic brake instruction such that the revised first trip plan results in a poorer fuel economy and/or higher emissions relative to the first trip plan before the first trip plan was revised at 504.

In some embodiments, generating at 502 the alternating throttle and dynamic brake instruction includes generating, at 502a, the alternating throttle and dynamic brake instruction to hold the speed of the vehicle at or below a designated speed value to hold the speed of the vehicle at or below a speed limit along one or more segments of the route of the vehicle (i.e., within one or more regions of the transportation network), which enables the vehicle to travel as fast as possible without disobeying designated speed limits along the route. In an embodiment, the value of the speed limit for a particular region of the transportation network may change depending on weather conditions, the condition of the route (e.g., the condition of a railroad track, a road, and/or the like), and/or the like. The designated speed value may therefore be selected based on the actual value of the speed limit for such weather and/or route conditions. Optionally, the designated speed value is less than the actual speed limit by a factor of safety.

Generating at 502 the alternating throttle and dynamic brake instruction optionally includes generating, at 502b, the alternating throttle and dynamic brake instruction to hold the speed of the vehicle at or below a designated speed value to prevent damage to the vehicle, which may enable the vehicle to travel as fast as possible without damaging components of the vehicle. In an embodiment, the value of the speed at which the vehicle may experience damage when exceeded may change depending on weather conditions, the condition of the route (e.g., the condition of a railroad track, a road, and/or the like), and/or the like. The designated speed value that is selected to prevent damage to the vehicle may therefore be based on such weather and/or route conditions. Optionally, the designated speed value is less, by a factor of safety, than the speed at which the vehicle may experience damage when exceeded.

In some embodiments, generating at 502 the alternating throttle and dynamic brake instruction optionally includes generating, at 502c, the alternating throttle and dynamic brake instruction to hold the speed of the vehicle at or below a designated speed value to maintain operation of the vehicle within designated safe operating limits, which may enable the vehicle to travel as fast as possible without losing control, without derailing, and/or without causing a traffic accident. In an embodiment, the speed above which operation of the vehicle is outside designated safe operating limits may change depending on weather conditions, the condition of the route (e.g., the condition of a railroad track, a road, and/or the like), and/or the like. The designated speed value that is selected to maintain operation of the vehicle within designated safe operating limits may therefore be based on such weather and/or route conditions. Optionally, the designated speed value is less, by a factor of safety, than the speed above which operation of the vehicle is outside designated safe operating limits.

It should be understood that the method 500 may include any combination of the steps 502a, 502b, and/or 502c.

The trip plan of the vehicle may be created and/or revised at 504 based on any factors, for any reason(s) and/or in response to the occurrence of any condition(s). For example, the trip plan may be created at 504 such that the trip plan includes the alternating throttle and dynamic brake instruction based on a speed limit difference between different regions within the transportation network, a weather forecast for a region within the transportation network, a regulatory requirement (e.g., emission limits) of a region through which the vehicle travels along the route, a scheduled maintenance operation, a condition of one or more segments of the route, a configuration of the vehicle, a schedule of another vehicle traveling within the transportation network, and/or the like. For example, the brake-against throttle instruction may be included within the trip plan such that the brake-against throttle instruction instructs the initiation of applying the brake while maintaining the throttle at the designated setting when the vehicle arrives at a location along the route where the speed limit increases. Moreover, and for example, the trip plan may be created at 504 to include different alternating throttle and dynamic brake instructions that have different designated speed values and/or different amounts of brake application for various regions of the transportation network that have different speed limits.

When based on a weather forecast and/or a condition of one or more segments of the route, the brake-against throttle instruction may be included within the trip plan such that the brake-against throttle instruction is applied when the vehicle enters a region where the weather forecast and/or the condition of the corresponding segment(s) of the route allows the vehicle to travel at an increased speed in a safe manner, for example. Moreover, and for example, the trip plan may be created at 504 to include different alternating throttle and dynamic brake instructions that have different designated speed values and/or different amounts of brake application for various regions of the transportation network that have different weather and/or route conditions.

One example of creating at 504 the trip plan based on a configuration of the vehicle includes creating at 504 the trip plan to include one or more different alternating throttle and dynamic brake instructions having designated speed values that are based on the speed rating of one or more components of the vehicle and/or break-up speed of the vehicle, which may prevent the vehicle from being damaged. One example of creating at 504 the trip plan based on the schedule of another vehicle traveling within the transportation network includes creating at 504 the trip plan to include one or more different brake-against throttle instructions that prevent the vehicle from colliding with the other vehicle at one or more waypoints of the transportation network.

Examples of when the trip plan of the vehicle is created and/or revised at 504 upon the occurrence of one or more conditions include, but are not, limited to, a change in weather of one or more regions of the transportation network, a change in a weather forecast for one or more regions of the transportation network, a revision to a speed limit within a region of the transportation network, a change of an original objective of the trip plan, a difference between a model parameter of a trip profile of the trip plan and an actual parameter of the vehicle as the vehicle is traveling along the trip within the transportation network, a change in the schedule of the vehicle, a change in the schedule of another vehicle traveling within the transportation network, the vehicle falling behind the schedule of the vehicle, a change in a traffic condition within the transportation network, failure of a component onboard the vehicle, a traffic accident within the transportation network, a change in a regulatory requirement (e.g., emission limits) of a region through which the vehicle travels along the route, a change to a scheduled maintenance operation, and/or the like. For example, actual parameters (e.g., weather conditions, route conditions, vehicle configuration, travel time of the vehicle, the speed of the vehicle, and/or the like) may be monitored during the trip of the vehicle. The trip plan of the vehicle may be revised at 504 to include one or more alternating throttle and dynamic brake instructions and/or to modify one or more existing alternating throttle and dynamic brake instructions when the actual parameters experienced during the trip differ from model parameters used to initially create the trip plan, for example.

Moreover, and for example, the method 500 may include revising, at 504a, the trip plan of the vehicle to include the alternating throttle and dynamic brake instruction(s) in response to the vehicle falling behind a schedule of the trip of the vehicle within the transportation network. The method 500 may thus revise the trip plan of the vehicle to enable the vehicle to travel at an increased speed along one or more segments of the remainder of the route of the vehicle to thereby make up time in the schedule (e.g., compensate for the delay that caused the vehicle to fall behind schedule). The revised trip plan may therefore enable the vehicle to arrive at the destination location, and/or at one or more intermediate waypoints, at the scheduled arrival time despite falling behind schedule earlier in the trip.

One example of revising at 504a the trip plan when the vehicle falls behind schedule includes revising the trip plan at 504a to include application of one or more alternating throttle and dynamic brake instructions for an entirety of the remainder of the trip of the vehicle (i.e., along all of the remaining segments of the route of the vehicle). Another example of revising at 504a the trip plan when the vehicle falls behind schedule includes revising the trip plan 504a to include application of the alternating throttle and dynamic brake instruction along only one or some of the remaining segments of the route of the vehicle. For example, the vehicle may fall behind schedule such that the vehicle is no longer scheduled to arrive at a waypoint within the transportation network before another vehicle, which may cause the vehicles to arrive at the waypoint at the same time and thereby possibly collide with each other. Accordingly, the revising at 504a the trip plan may include revising at 504a the trip plan to include application of the alternating throttle and dynamic brake instruction along one or more segments of the route that are upstream from the waypoint such that the vehicle arrives at, and passes through, the waypoint before the other vehicle arrives at the waypoint. The method 500 may thus enable the vehicle to travel at an increased speed along one or more segments before reaching a waypoint to thereby make up time in the schedule and arrive at the waypoint before another vehicle arrives at the waypoint, which may enable the vehicle to avoid a collision with the other vehicle.

One example of a reason for creating and/or revising at 504 the trip plan such that the trip plan includes the alternating throttle and dynamic brake instruction(s) includes the vehicle being designated as a hot shot vehicle. Accordingly, the method 500 may include creating and/or revising, at 504b, the trip plan such that the trip plan includes one or more alternating throttle and dynamic brake instructions when the vehicle has been designated as a hot shot vehicle. The method 500 may thus enable a vehicle that is given priority within the transportation network to travel non-stop at the highest possible speed that is within legal and designated safe operating limits.

Another example of a reason for creating and/or revising at 504 the trip plan such that the trip plan includes the alternating throttle and dynamic brake instruction(s) includes hedging against a possible delay later in the trip of the vehicle. Specifically, the method 500 may include creating and/or revising, at 504c, the trip plan such that the trip plan includes one or more alternating throttle and dynamic brake instructions along one or more first segments of the route of the vehicle responsive to a determined possible delay of the vehicle within one or more second segments of the trip that are subsequent to the first segment(s). The method 500 may therefore enable the vehicle to travel at a faster speed along one or more segments of the route to compensate for one or more downstream segments of the route where the vehicle may have to travel at a reduced speed.

It should be understood that the method 500 may include any combination of the steps 504a, 504b, and 504c.

In an embodiment, a method includes operating a vehicle traveling in a transportation network with a throttle of the vehicle at a maximum throttle setting during a trip of the vehicle along a route from a first location to a different, second location. The method also includes applying a dynamic brake of the vehicle at a maximum brake setting of the dynamic brake, and alternating between operating the vehicle with the throttle at the maximum throttle setting and applying the dynamic brake of the vehicle at the maximum brake setting along the route being traveled by the vehicle from the first location to the second location.

In an aspect, alternating between operating the vehicle with the throttle at the maximum throttle setting and applying the dynamic brake of the vehicle at the maximum brake setting includes holding a speed of the vehicle at or below a designated speed value in one or more locations along the route of the vehicle.

In an aspect, alternating between operating the vehicle with the throttle at the maximum throttle setting and applying the dynamic brake of the vehicle at the maximum brake setting includes reducing a travel time of the trip of the vehicle within the transportation network relative to operating the vehicle at one or more other throttle settings.

In an aspect, applying the dynamic brake using the vehicle control unit includes calculating, using a vehicle control unit located onboard the vehicle, the maximum brake setting based on at least one of a current speed of the vehicle, route and/or geography data, or a designated safe braking limit of the vehicle.

In an aspect, the maximum throttle setting corresponds to a designated safe operating limit of the vehicle, and applying the dynamic brake of the vehicle at the maximum brake setting includes applying the dynamic brake responsive to a change in the designated safe operating limit of the vehicle along one or more locations along the route being traveled by the vehicle.

In an aspect, alternating between operating the vehicle with the throttle at the maximum throttle setting and applying the dynamic brake of the vehicle at the maximum brake setting includes alternating between operating the vehicle with the throttle at the maximum throttle setting and applying the dynamic brake of the vehicle at the maximum brake setting using a vehicle control unit located onboard the vehicle.

In an aspect, the maximum throttle setting of the throttle is a highest possible setting of the throttle.

In an aspect, the maximum throttle setting of the throttle is a lower setting of the throttle than a highest possible setting of the throttle, and the maximum throttle setting of the throttle corresponds to a designated safe operating limit of the vehicle.

In an aspect, the maximum brake setting of the dynamic brake is a highest possible setting of the dynamic brake.

In an aspect, the maximum brake setting of the dynamic brake is a lower setting of the dynamic brake than a highest possible setting of the dynamic brake, and the maximum brake setting of the dynamic brake corresponds to a designated safe braking limit of the vehicle.

In an aspect, the dynamic brake of the vehicle is applied to at least one of prevent damage to the vehicle or maintain operation of the vehicle within a designated safe operating limit of the vehicle.

In an aspect, the method further includes switching from operating the vehicle at a throttle setting that produces less propulsive output than the maximum throttle setting to the maximum throttle setting responsive to the vehicle falling behind a schedule of the trip of the vehicle within the transportation network.

In an aspect, the method further includes overriding a trip plan of the vehicle that designates operational settings of the vehicle as a function of at least one of distance or time along the trip of the vehicle within the transportation network.

In an aspect, alternating between operating the vehicle with the throttle at the maximum throttle setting and applying the dynamic brake of the vehicle at the maximum brake setting includes overriding a trip plan of the vehicle that designates operational settings of the vehicle as a function of at least one of distance or time along the trip of the vehicle within the transportation network, wherein the operational settings of the trip plan are other than the alternating between operating the vehicle with the throttle at the maximum throttle setting and applying the dynamic brake of the vehicle at the maximum brake setting.

In an aspect, operating the vehicle with the throttle at the maximum throttle setting includes automatically operating the vehicle with the throttle at the maximum throttle setting using a vehicle control unit located onboard the vehicle, and/or applying the dynamic brake of the vehicle at the maximum brake setting includes automatically applying the dynamic brake of the vehicle using a vehicle control unit located onboard the vehicle.

In an embodiment, a method includes generating one or more alternating throttle and dynamic brake instructions for a vehicle configured to travel in a transportation network to alternate between operating the vehicle with a throttle of the vehicle at a maximum throttle setting and applying a dynamic brake of the vehicle at a maximum brake setting of the dynamic brake along a route being traveled by the vehicle. The method also includes at least one of creating or revising a trip plan of a trip of the vehicle within the transportation network such that the trip plan includes the one or more alternating throttle and dynamic brake instructions for at least one segment of the trip. The trip plan designates operational settings of the vehicle as a function of at least one of distance or time along the trip of the vehicle.

In an aspect, generating the one or more alternating throttle and dynamic brake instructions includes generating the one or more alternating throttle and dynamic brake instructions to hold a speed of the vehicle at or below a designated speed value in one or more locations along the route of the vehicle.

In an aspect, at least one of creating or revising the trip plan includes revising the trip plan to include the one or more alternating throttle and dynamic brake instructions responsive to the vehicle falling behind a schedule of the trip.

In an aspect, at least one of creating or revising the trip plan includes creating the trip plan such that the trip plan includes the one or more alternating throttle and dynamic brake instructions based on at least one of a speed limit difference between different regions within the transportation network, a weather forecast for a region within the transportation network, a condition of one or more segments of the route, a configuration of the vehicle, or a schedule of another vehicle traveling within the transportation network.

In an aspect, at least one of creating or revising the trip plan includes reducing a travel time of the vehicle along the trip relative to operating the vehicle at one or more other throttle settings and one or more other brake settings.

In an aspect, at least one of creating or revising the trip plan includes at least one of creating or revising the trip plan such that the vehicle arrives at a waypoint within the transportation network before the arrival of another vehicle at the waypoint.

In an aspect, at least one of creating or revising the trip plan includes at least one of creating or revising the trip plan responsive to at least one of a change in weather, a change in a weather forecast, a revision to a speed limit within a region of the transportation network, a change of an original objective of the trip plan, a difference between a model parameter of a trip profile of the trip plan and an actual parameter of the vehicle as the vehicle is traveling along the trip within the transportation network, a change in a schedule of the vehicle, a change in a schedule of another vehicle traveling within the transportation network, a change in a traffic condition within the transportation network, failure of a component onboard the vehicle, or a traffic accident within the transportation network.

In an aspect, at least one of creating or revising the trip plan includes at least one of creating or revising the trip plan such that the trip plan includes the one or more alternating throttle and dynamic brake instructions for a first segment of the trip responsive to a determined possible delay of the vehicle within a second segment of the trip that is subsequent to the first segment.

In an aspect, generating the one or more alternating throttle and dynamic brake instructions includes automatically generating the one or more alternating throttle and dynamic brake instructions onboard the vehicle or at a remote location from the vehicle.

In an aspect, at least one of creating or revising the trip plan includes at least one of creating or revising the trip plan automatically onboard the vehicle or at a remote location from the vehicle.

In an embodiment, a system includes a control unit configured to control operation of a vehicle that is configured to travel in a transportation network. The control unit is configured to operate the vehicle with a throttle of the vehicle at a maximum throttle setting during a trip of the vehicle along a route from a first location to a different, second location, apply a dynamic brake of the vehicle at a maximum brake setting of the dynamic brake, and alternate between operating the vehicle with the throttle at the maximum throttle setting and applying the dynamic brake of the vehicle at the maximum brake setting along the route being traveled by the vehicle from the first location to the second location.

In an embodiment, a method includes operating a vehicle traveling in a transportation network with a throttle of the vehicle at a maximum throttle setting during a trip of the vehicle along a route from a first location to a different, second location; applying a dynamic brake of the vehicle at a maximum brake setting of the dynamic brake; and alternating between operating the vehicle with the throttle at the maximum throttle setting and applying the dynamic brake of the vehicle at the maximum brake setting along a route being traveled by the vehicle from the first location to the second location, wherein operating the vehicle with the throttle at the maximum throttle setting comprises automatically operating the vehicle with the throttle at the maximum throttle setting using a vehicle control unit located onboard the vehicle, and wherein applying the dynamic brake of the vehicle at the maximum brake setting comprises automatically applying the dynamic brake of the vehicle using a vehicle control unit located onboard the vehicle.

In an embodiment, a method includes operating a vehicle traveling in a transportation network with a throttle of the vehicle at a maximum throttle setting during a trip of the vehicle along a route from a first location to a different, second location; applying a dynamic brake of the vehicle at a maximum brake setting of the dynamic brake; and alternating between operating the vehicle with the throttle at the maximum throttle setting and applying the dynamic brake of the vehicle at the maximum brake setting along a route being traveled by the vehicle from the first location to the second location, wherein the step of alternating is performed based at least in part on a trip plan of the vehicle that designates operational settings of the vehicle as a function of at least one of distance or time along the trip of the vehicle.

In an embodiment, a method includes operating a vehicle traveling in a transportation network with a throttle of the vehicle at a maximum throttle setting during a trip of the vehicle along a route from a first location to a different, second location; applying a dynamic brake of the vehicle at a maximum brake setting of the dynamic brake; and alternating between operating the vehicle with the throttle at the maximum throttle setting and applying the dynamic brake of the vehicle at the maximum brake setting along a route being traveled by the vehicle from the first location to the second location, wherein the alternating between operating the vehicle with the throttle at the maximum throttle setting and applying the dynamic brake of the vehicle at the maximum brake setting includes overriding a trip plan of the vehicle that designates operational settings of the vehicle as a function of at least one of distance or time along the trip of the vehicle within the transportation network, and wherein the operational settings of the trip plan are other than the alternating between operating the vehicle with the throttle at the maximum throttle setting and applying the dynamic brake of the vehicle at the maximum brake setting.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

The systems, devices, units, modules, components, and/or the like of the embodiments described and/or illustrated herein can include or represent hardware and associated instructions (e.g., software stored on a tangible and non-transitory computer readable storage medium, such as a computer hard drive, ROM, RAM, or the like) that perform the operations described herein. The hardware may include electronic circuits or circuitry, which may include and/or be connected and/or coupled to one or more logic-based devices, such as, but not limited to, microprocessors, processors, controllers, microcontrollers, and/or the like, that operate using instructions stored on a tangible and non-transitory computer readable medium (e.g., a computer hard drive, ROM, RAM, EEPROM, flash drive, and/or the like), such as software, and/or that operate based on instructions that are hard wired into the logic of the device(s). The logic-based devices may be off-the-shelf devices that perform the operations described herein from the instructions described above. Additionally or alternatively, one or more of the logic-based devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
    operating a rail vehicle traveling in a transportation network with a throttle of the vehicle at a maximum throttle setting during a trip of the vehicle along a route from a first location to a different, second location, the vehicle operated by a controller to control one or more of, generating a first control signal that causes a propulsion subsystem of the vehicle to automatically implement the maximum throttle setting of the vehicle or that instructs an operator of the vehicle to manually implement the maximum throttle setting of the vehicle;
    applying a dynamic brake of the vehicle at a maximum brake setting of the dynamic brake with the throttle at the maximum throttle setting immediately before applying the dynamic brake at the maximum brake setting, the dynamic brake of the vehicle operated by the controller to control one or more of, generating a second control signal that causes the dynamic brake to automatically implement the maximum brake setting, or that instructs the operator of the vehicle to manually implement the maximum brake setting; and
    alternating between operating the vehicle with the throttle at the maximum throttle setting and applying the dynamic brake of the vehicle at the maximum brake setting with the throttle at the maximum throttle setting immediately before applying the dynamic brake at the maximum brake setting along the route being traveled by the vehicle from the first location to the second location by the controller to control one or more of, generating the first control signal to cause the propulsion system to automatically implement the maximum throttle setting, or to instruct the operator to manually implement the maximum throttle setting, and to control one or more of, generating the second control signal to cause the dynamic brake to automatically implement the maximum brake setting, or to instruct the operator to manually implement the maximum brake setting.

2. The method of claim 1, wherein alternating between operating the vehicle with the throttle at the maximum throttle setting and applying the dynamic brake of the vehicle at the maximum brake setting comprises holding a speed of the vehicle at or below a designated speed value in one or more locations along the route of the vehicle.

3. The method of claim 1, wherein alternating between operating the vehicle with the throttle at the maximum throttle setting and applying the dynamic brake of the vehicle at the maximum brake setting comprises reducing a travel time of the trip of the vehicle within the transportation network relative to operating the vehicle at one or more other throttle settings.

4. The method of claim 1, wherein applying the dynamic brake comprises calculating, using the controller, the maximum brake setting based on at least one of a current speed of the vehicle, at least one of route data or geography data, or a designated safe braking limit of the vehicle.

5. The method of claim 1, wherein the maximum throttle setting corresponds to a designated safe operating limit of the vehicle, and wherein applying the dynamic brake of the vehicle at the maximum brake setting comprises applying the dynamic brake responsive to a change in the designated safe operating limit of the vehicle along one or more locations along the route being traveled by the vehicle.

6. The method of claim 1, wherein alternating between operating the vehicle with the throttle at the maximum throttle setting and applying the dynamic brake of the vehicle at the maximum brake setting comprises alternating between operating the vehicle with the throttle at the maximum throttle setting and applying the dynamic brake of the vehicle at the maximum brake setting using a vehicle control unit located onboard the vehicle.

7. The method of claim 1, wherein the maximum throttle setting of the throttle is a lower setting of the throttle than a highest possible setting of the throttle, the maximum throttle setting of the throttle corresponding to a designated safe operating limit of the vehicle.

8. The method of claim 1, wherein the maximum brake setting of the dynamic brake is a lower setting of the dynamic brake than a highest possible setting of the dynamic brake, the maximum brake setting of the dynamic brake corresponding to a designated safe braking limit of the vehicle.

9. The method of claim 1, wherein alternating between operating the vehicle with the throttle at the maximum throttle setting and applying the dynamic brake of the vehicle at the maximum brake setting comprises overriding a trip plan of the vehicle that designates operational settings of the vehicle as a function of at least one of distance or time along the trip of the vehicle within the transportation network, the operational settings of the trip plan being other than the alternating between operating the vehicle with the throttle at the maximum throttle setting and applying the dynamic brake of the vehicle at the maximum brake setting.

10. The method of claim 1, wherein at least one of:
   operating the vehicle with the throttle at the maximum throttle setting comprises automatically operating the vehicle with the throttle at the maximum throttle setting using the controller located onboard the vehicle; or
   applying the dynamic brake of the vehicle at the maximum brake setting comprises automatically applying the dynamic brake of the vehicle using the controller located onboard the vehicle.

11. A method comprising:
   generating one or more alternating throttle and dynamic brake instructions for a rail vehicle configured to travel in a transportation network to alternate between operating the vehicle with a throttle of the vehicle at a maximum throttle setting and applying a dynamic brake of the vehicle at a maximum brake setting of the dynamic brake with the throttle at the maximum throttle setting immediately before applying the dynamic brake at the maximum brake setting along a route being traveled by the vehicle, the one or more alternating throttle and dynamic brake instructions, generated by a controller to control one or more of:
      automatically control a propulsion subsystem of the vehicle to operate using the maximum throttle setting and automatically control the dynamic brake to operate using the maximum brake setting, or
      instruct an operator of the vehicle to manually control the propulsion subsystem to operate using the maximum throttle setting and manually control the dynamic brake to operate using the maximum brake setting; and
   at least one of creating or revising a trip plan of a trip of the vehicle within the transportation network such that the trip plan includes the one or more alternating throttle and dynamic brake instructions for at least one segment of the trip, the trip plan designating operational settings of the vehicle as a function of at least one of distance or time along the trip of the vehicle.

12. The method of claim 11, wherein generating the one or more alternating throttle and dynamic brake instructions comprises generating the one or more alternating throttle and dynamic brake instructions to hold a speed of the vehicle at or below a designated speed value in one or more locations along the route of the vehicle.

13. The method of claim 11, wherein at least one of creating or revising the trip plan comprises revising the trip plan to include the one or more alternating throttle and dynamic brake instructions responsive to the vehicle falling behind a schedule of the trip.

14. The method of claim 11, wherein at least one of creating or revising the trip plan comprises creating the trip plan such that the trip plan includes the one or more alternating throttle and dynamic brake instructions based on at least one of a speed limit difference between different regions within the transportation network, a weather forecast for a region within the transportation network, or a schedule of another vehicle traveling within the transportation network.

15. The method of claim 11, wherein at least one of creating or revising the trip plan comprises reducing a travel time of the vehicle along the trip relative to operating the vehicle at one or more other throttle settings and one or more other brake settings.

16. The method of claim 11, wherein at least one of creating or revising the trip plan comprises at least one of creating or revising the trip plan such that the vehicle arrives at a waypoint within the transportation network before the arrival of another vehicle at the waypoint.

17. The method of claim 11, wherein at least one of creating or revising the trip plan comprises at least one of creating or revising the trip plan responsive to at least one of a change in weather, a change in a weather forecast, a change in a schedule of the vehicle, a change in a schedule of another vehicle traveling within the transportation network, a change in a traffic condition within the transportation network, failure of a component onboard the vehicle, or a traffic accident within the transportation network.

18. The method of claim 11, wherein generating the one or more alternating throttle and dynamic brake instructions comprises automatically generating the one or more alternating throttle and dynamic brake instructions onboard the vehicle or at a remote location from the vehicle.

19. The method of claim 11, wherein at least one of creating or revising the trip plan comprises at least one of creating or revising the trip plan automatically onboard the vehicle or at a remote location from the vehicle.

20. A system comprising:
   a controller configured to control operation of a rail vehicle that is configured to travel in a transportation network, the control unit being configured to:
   operate the vehicle with a throttle of the vehicle at a maximum throttle setting during a trip of the vehicle along a route from a first location to a different, second location, the controller configured to operate the vehicle by generating a first control signal that one or more of, automatically controls a propulsion subsystem of the vehicle using the maximum throttle setting, or instructs an operator to manually control the propulsion subsystem using the maximum throttle setting;

apply a dynamic brake of the vehicle at a maximum brake setting of the dynamic brake with the throttle at the maximum throttle setting immediately before applying the dynamic brake at the maximum brake setting, the controller configured to apply the dynamic brake by generating a second control signal that one or more of automatically applies the dynamic brake at the maximum brake setting, or instructs the operator to apply the dynamic brake at the maximum brake setting; and alternate between operating the vehicle with the throttle at the maximum throttle setting by generating the first control signal and applying the dynamic brake of the vehicle at the maximum brake setting by generating the second control signal along the route being traveled by the vehicle from the first location to the second location.

* * * * *